United States Patent [19]
Eguchi et al.

[11] Patent Number: 5,352,949
[45] Date of Patent: Oct. 4, 1994

[54] VIBRATION DRIVEN ACTUATOR

[75] Inventors: Masaharu Eguchi, Yokohama; Mitsuru Shinohara, Tokyo, both of Japan

[73] Assignee: Canon Kabushiki Kaisha, Tokyo, Japan

[21] Appl. No.: 935,422

[22] Filed: Aug. 26, 1992

[30] Foreign Application Priority Data

Aug. 30, 1991 [JP] Japan ................. 3-220057
Aug. 30, 1991 [JP] Japan ................. 3-220058

[51] Int. Cl.⁵ .................... H01L 41/09; G02B 7/04
[52] U.S. Cl. ......................... 310/323; 310/325
[58] Field of Search ........................ 310/323, 325

[56] References Cited

U.S. PATENT DOCUMENTS

| | | | |
|---|---|---|---|
| 4,793,689 | 12/1988 | Aoyagi et al. | 310/323 |
| 4,935,659 | 6/1990 | Naka et al. | 310/323 |
| 4,999,536 | 3/1991 | Toda | 310/323 |
| 5,008,581 | 4/1991 | Kumada et al. | 310/323 |
| 5,124,611 | 6/1992 | Tamai et al. | 310/317 |
| 5,231,325 | 7/1993 | Tamai et al. | 310/323 |

FOREIGN PATENT DOCUMENTS

0406843A2 1/1991 European Pat. Off. ..... H01L 41/09
2-253212 10/1990 Japan ..................... G02B 7/04

Primary Examiner—Thomas M. Dougherty
Attorney, Agent, or Firm—Fitzpatrick, Cella, Harper & Scinto

[57] ABSTRACT

A first ball lace and a second ball lace, which is arranged at a position opposite to the first ball lace to sandwich a ball between itself and the first ball lace are coaxially assembled in a pencil shaped vibration driven motor or actuator, so that the second ball lace can be operated externally, and the rotational force of the ball can be output to an external device.

10 Claims, 4 Drawing Sheets

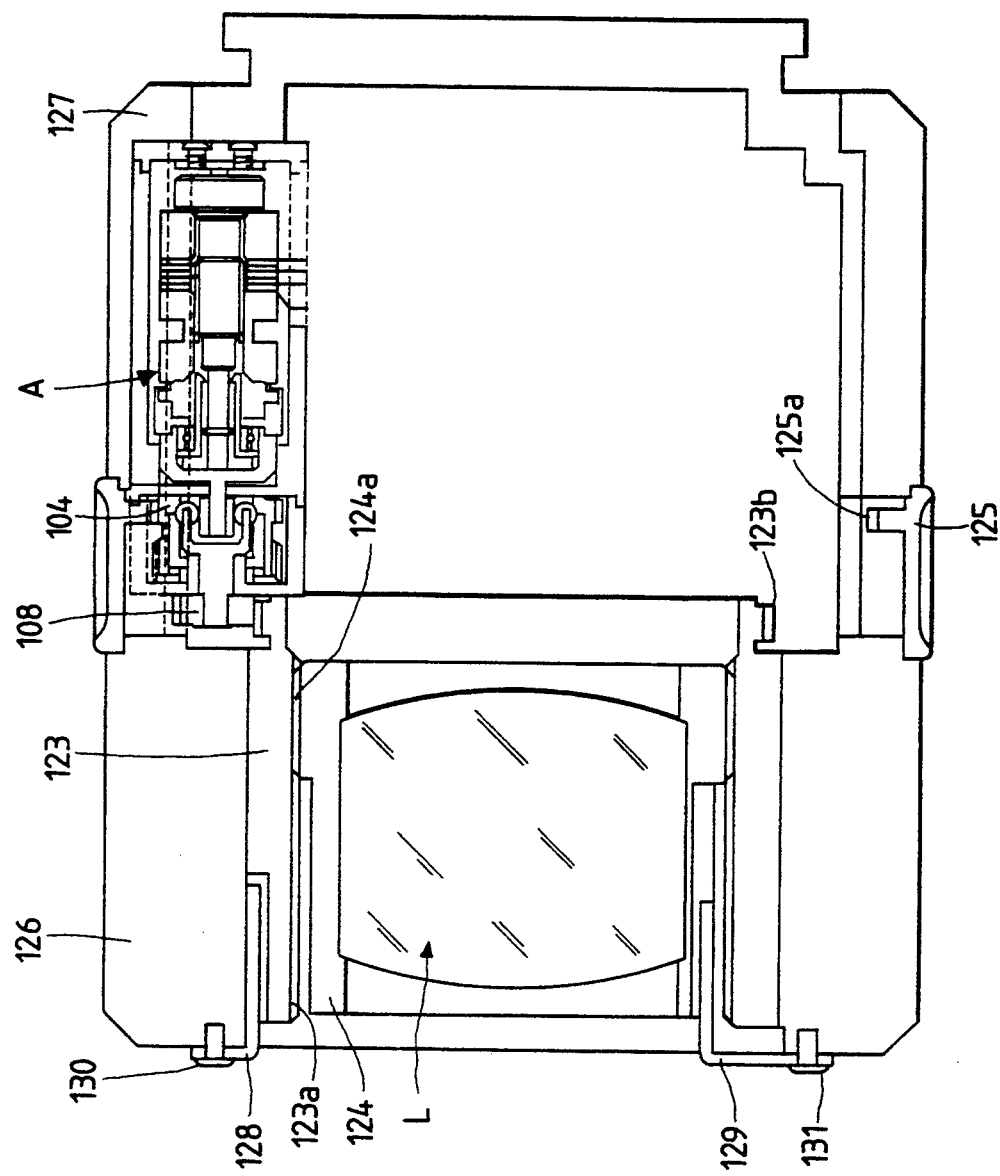

5,352,949

VIBRATION DRIVEN ACTUATOR

BACKGROUND OF THE INVENTION

1. Field of the Invention

The present invention relates to a differential mechanism built-in type vibration driven motor, which incorporates a differential mechanism for selectively or simultaneously receiving a driving force of an electric motor and an external driving force (e.g., a driving force with a hand), and outputting a synthesized force, and in particular, uses a pencil shaped vibration driven motor.

2. Related Background Art

In recent years, a vibration driven motor has been used as an auto-focus driving source in an exchangeable lens of a camera, and a lens barrel, which can perform a motor-driven auto-focusing operation and a manual focusing operation without requiring a special switching operation, for example, as proposed in Japanese Patent Application Laid-Open No. 2-253212 by the present assignee. The vibration driven motor is formed into a hollow ring shape, and a differential mechanism using, e.g., a ball lace is proposed as a mechanism for switching between the auto-focusing operation and the manual focusing operation. The differential mechanism is also formed into a hollow ring shape to surround the optical lenses in the same manner as the vibration driven motor, and is assembled to the lens barrel integrally with the vibration driven motor.

However, such a differential mechanism built-in type vibration driven motor is suitable for the unique product shape of the lens barrel that surrounds the optical lenses since it has a hollow ring shape. However, in various product specifications and applications, and in particular, in those of the lens barrel, the maximum outer diameter, lens arrangement, and the like tend to be restricted by a motor section, resulting in poor versatility. Needless to say, a vibration driven motor need not have a hollow ring shape in terms of space and layout upon application to products other than a lens barrel, e.g., audio equipment.

The hollow ring-shaped vibration driven motor suffers from high cost, and requires cumbersome, time-consuming steps of bonding a piezo-electric element for generating a vibration to a ring-shaped vibration elastic body by an adhesive, and of performing a polarization treatment.

Thus, it is desired to integrally assemble a differential mechanism to a pencil shape vibration driven motor, which utilizes an ultrasonic vibration similar to the hollow ring-shaped vibration driven motor, but can be easily manufactured and rendered as small as a little finger of a person, whereby, for example, motor and manual driving operations can be desirably switched, a synthesized force of these operations can be output, and a compact structure can be realized.

SUMMARY OF THE INVENTION

According to one aspect of the invention, a first ball lace and a second ball lace, which is arranged at a position opposite to the first ball lace to sandwich a ball between itself and the first ball lace are coaxially assembled in a pencil shaped vibration driven motor or actuator, so that the second ball lace can be operated externally, and the rotational force of the ball can be output to an external device.

BRIEF DESCRIPTION OF THE DRAWINGS

FIG. 4 is a sectional view showing a state wherein the motor driving apparatus shown in FIG. 3 is assembled in a lens barrel.

DESCRIPTION OF THE PREFERRED EMBODIMENTS

Figure 1:
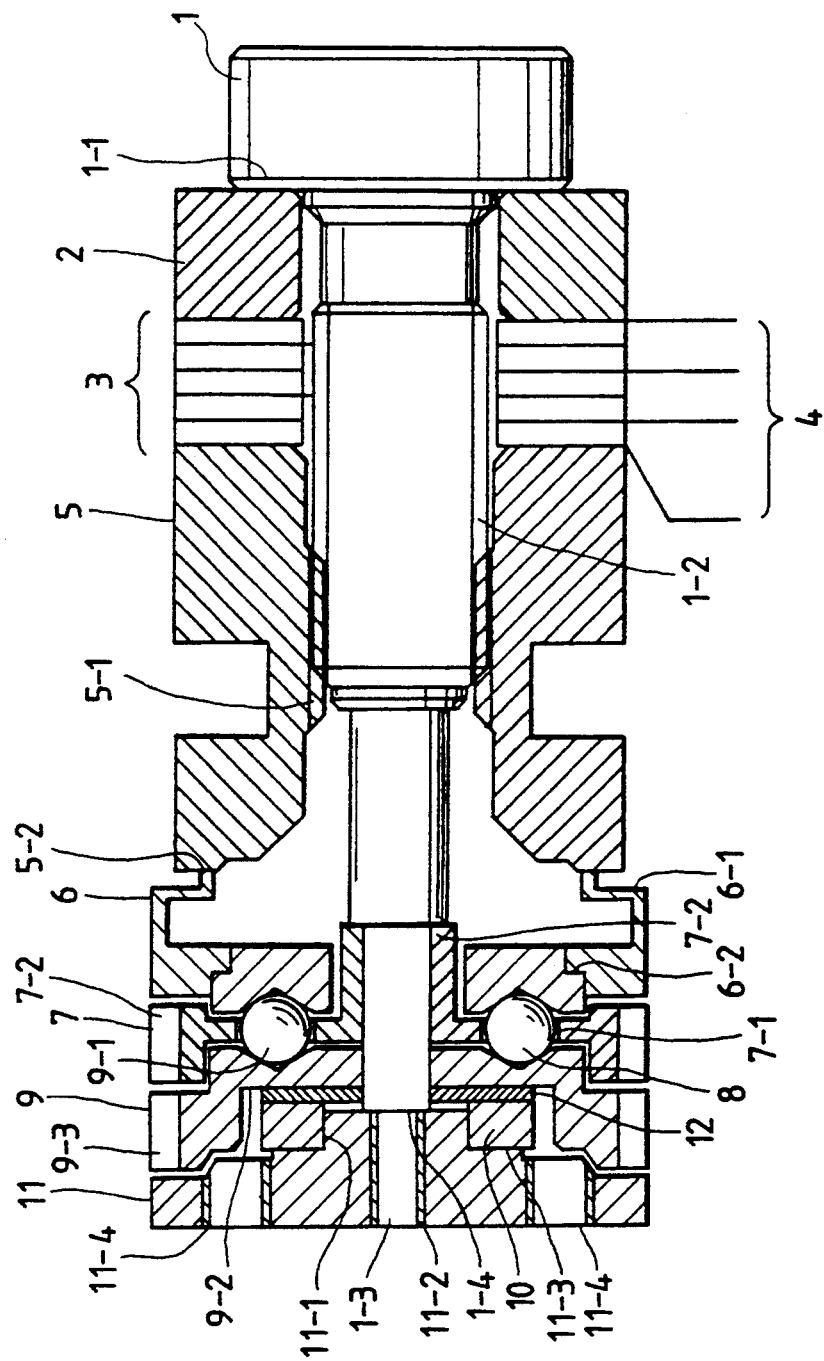
FIG. 1 is a sectional view showing a vibration driven motor according to a first embodiment of a present invention.

FIG. 1 is a sectional view showing a differential mechanism built-in type pencil shaped vibration driven motor according to the first embodiment of the present invention.

The vibration driven motor is constituted by stacking, on the central axis from the left in FIG. 1, a coupling shaft 1, a metal spacer 2, axially stacked piezo-electric elements 3 as an electro-mechanical energy converting element, electrodes 4 for applying a voltage to the piezo-electric element, a metal stator 5, a rotor 6, a retainer 7 for loosely holding balls 8, a compression rotary member 9, an elastic compression member 10, a compression holding means 11, and a friction washer 12.

The spacer 2 is fitted on the shaft (bolt) 1 from the left in FIG. 1 to abut against a stepped portion 1—1 as a disengagement prevention means of the shaft 1. The piezo-electric elements 3 and the electrodes 4 are alternately stacked. The spacer 2, the piezo-electric elements 3, and the electrodes 4 are clamped under pressure to be fixed to the shaft 1 by fastening a threaded portion 5-1 formed on the inner-diameter portion of the stator 5 to a first threaded portion 1-2 of the shaft 1.

The rotor 6 is divided into two bodies, so that the materials and surface treatments can be independently selected. That is, the rotor 6 is constituted by a stator-side portion having a flange portion 6-1 which is in peripheral contact with a frictional driving surface 5-2 of the stator 5, and a ball lace portion 6-2 contacting the balls 8. The ball lace portion 6-2 has a V-shaped circumferential groove (to be referred to has a V groove hereinafter), and regulates the revolution radius of each ball. At least three balls (steel balls) having the same diameter are arranged on the V groove. The balls 8 are loosely fitted and held in hole portions 7-1, which are foraged on substantially the same radius as that of the V groove at equal angular intervals on the peripheral portion of the retainer 7, and have a diameter larger than at least the diameter of the ball. The retainer 7 has a bearing portion 7-2 fitted on the shaft 1, and is rotatable about the shaft 1. Each hole portion 7-1 for holding the ball 8 contacts the ball only upon revolution of the ball in the circumferential direction, and is in sliding contact with the ball upon rolling of the ball 8 on the V groove, and rotation caused by the revolution.

The compression rotary member 9 is rotatably held by the shaft 1 like in the retainer 7, and has a V groove 9-1 like the above-mentioned V groove on the right surface, as shown in FIG. 1. The rotary member 9 clamps the balls 8 with the ball lace portion 6-2 of the rotor 6 in a thrust direction, and regulates the revolution radius of the balls. The left surface (as shown in FIG. 1) of the compression rotary member 9 contacts a surface of the friction washer 12.

The friction washer 12 is substantially fitted on the shaft 1. In this case, a conventional anti-rotation fitting pattern such as a "D" cut pattern, a double D cut pattern (neither are shown), or the like may be employed so as to assure non-rotation with respect to the shaft portion.

In a state wherein the elastic compression member 10 is substantially fitted on a small-diameter portion 11-1 of the compression holding member 11 from the left side of the friction washer 12, a threaded portion 11-2 of the compression holding member 11 is engaged with a second threaded portion 1-3 of the shaft 1, and the compression holding member 11 is fastened to a thread abutting step 1-4 of the shaft 1. Thus, the elastic compression member 10 is brought into contact with the friction washer 12 to generate a compression force. In this manner, the assembling operation is completed.

The elastic compression member 10 preferably comprises a constant force type belleville spring to eliminate variations in compression force due to individual differences or aging, but may comprise a rubber member, a coil spring, a wave washer, or the like.

When the compression force cannot stably fall within a desired range by the charge amount of the elastic compression member 10 determined by the mechanically abutting dimensions, the position of the step 1-4 can be easily moved outside the adjustment necessary range so as to individually adjust the fastened state of the threadable coupling portions 1-3 and 11-2.

The compression force is determined by the thrust space for the elastic compression member as a difference between the thrust length obtained by stacking the spacer 2, the piezo-electric elements 3, the electrodes 4, the stator 5, the rotor 6, the balls 8, the compression rotary member 9, and the friction washer 12 to have the disengagement prevention portion (stepped portion) 1—1 of the shaft as an end, and the thrust length up to a compression end face 11-3 of the compression holding member 11. Note that the retainer 7 does not receive any compression force.

The operation of the vibration driven motor is known to those who are skilled in the art since it is classified into a vibration driven motor of a so-called travelling wave type (e.g., EPO 406843 (disclosure date: Jan. 9, 1991; corresponding U.S. patent: U.S. Pat. No. 5,124,611). Therefore, an explanation of the differential mechanism portion will be given next.

<A: Input from motor>

When an AC signal is supplied from a known driver (not shown) to the electrodes 4, the piezo-electric elements 3 expand/contract, thereby generating bending vibrations in the X- and Y-directions. Then, when a synthesized vibration of these vibrations is generated in the stator 5, and the rotor 6 contacting the stator 5 under pressure is rotated in a predetermined direction, the balls 8 revolve along the V grooves while being rotated upon rotation relative to the non-rotating compression rotary member 9, and push the ball-side surfaces of the hole portions 7-1 of the retainer. For this reason, in this embodiment, the retainer 7 is rotated at a speed ½ that of the rotor, and an output gear portion 7-2 formed on the outer circumferential surface of the retainer 7 transmits a driving force to a member to be driven (not shown; e.g., a lens driving member of a camera).

<B: Input from compression rotary member (e.g., when compression rotary member is manually rotated)>

Upon relative rotation between the non-rotating rotor 6 and the compression rotary member 9 against the friction of the friction washer 12 by the compression frictional force, the retainer 7 is rotated at a speed ½ that of the compression rotary member 9, and externally outputs the driving force like in the case A.

<C: When motor and compression rotary member are simultaneously operated>

The retainer 7 outputs the driving force at a speed ½ the relative rotational amount (differential amount and direction) between the rotor 6 and the compression rotary member 9.

A gear portion 9-3 to be coupled to an input means (not shown; e.g., a manual operation member or an output from another power source means) is formed on the outer circumferential surface of the compression rotary member 9. However, this gear portion 9-3 and the gear portion 7-2 of the retainer 7 are not limited to a gear coupling. For example, pulleys for belt driving or rubber rollers for attaining coupling by means of frictional transmission may be arranged.

Note that the motor is fixed to equipment (e.g., a camera, printer, or the like), to which this motor is applied, using motor fixing screw holes 11-4 formed in the flange portion of the compression holding member 11.

Note that the motor may be fixed by forming screw holes in the spacer 2 or the stepped portion 1—1 of the shaft 1, or by chucking, insertion under pressure, adhesion, or the like.

Figure 2:
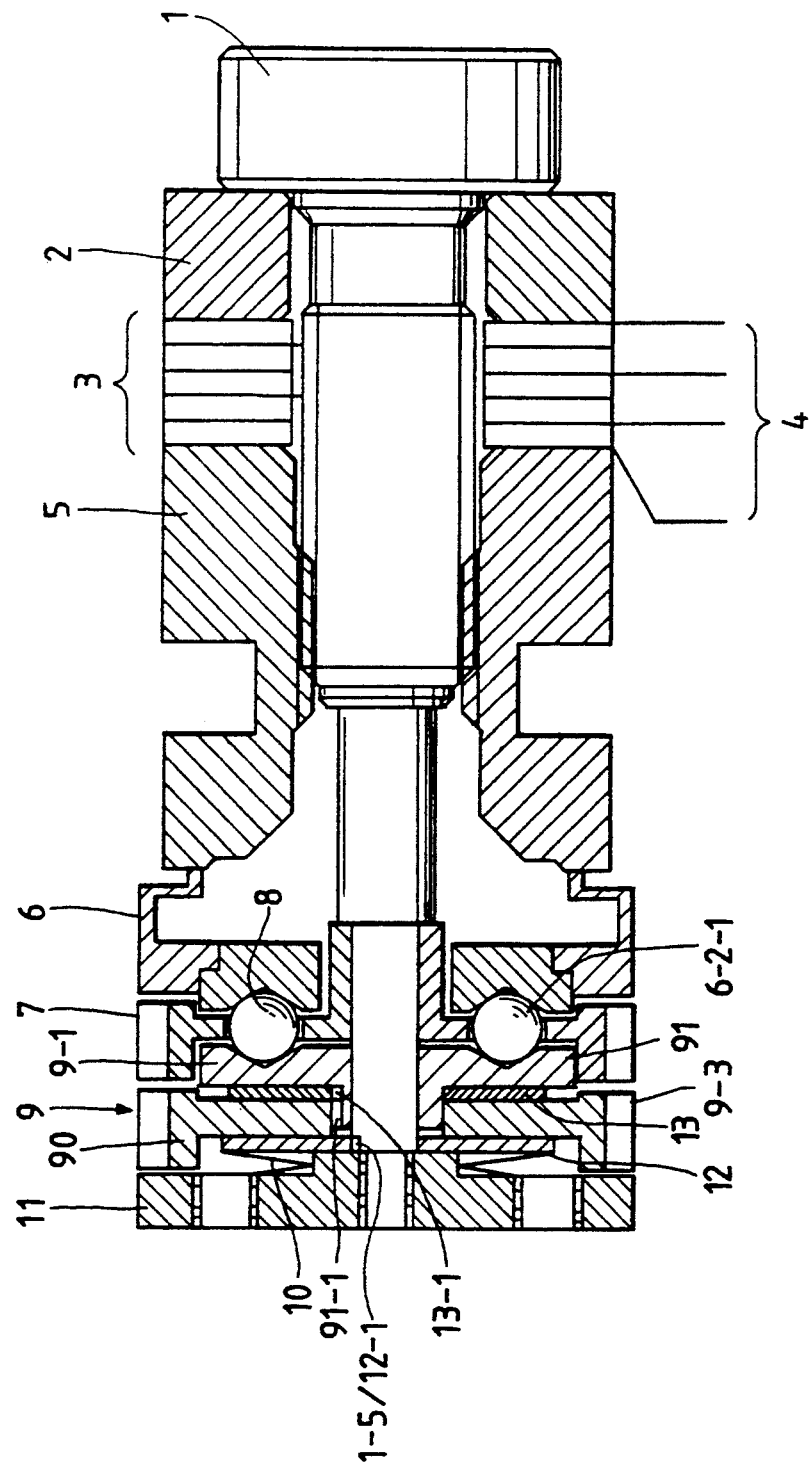
FIG. 2 is a sectional view showing a second embodiment of the present invention.

FIG. 2 is a sectional view showing a second embodiment of the present invention. The same reference numerals in this embodiment denote members having the same functions as those in FIG. 1. In particular, members 1 to 7 are the same as those in the embodiment shown in FIG. 1, and a detailed description thereof will be omitted.

The characteristic feature of this embodiment is that a compression rotary member 9 is divided into two bodies, i.e., a rotary portion 90, and a ball lace portion 91, and a second friction washer 13 is inserted between these portions. A first friction washer 12 is inserted between the rotary portion 90 and an elastic compression member 10.

The compression rotary member 9 is divided into the rotary portion 90 having a gear portion 9-3, and the ball lace portion 91 having a V groove 9-1. An engaging groove 91-1 is formed in the shaft portion of the ball lace portion 91 in the axial direction, and an engaging projection 13-1 projecting from the inner-diameter portion of the second friction washer 13 is engaged with the engaging groove 91-1, thereby preventing rotation of the friction washer 13. Note that a D cut or double D cut hole may be employed as the rotation prevention structure.

Upon engagement between the projection 13-1 and the engaging groove 91-1, the second friction washer 13 is non-rotatable relative to the ball lace portion 91. The materials of the first and second friction washers 12 and 13, the material of the compression rotary member, the contact area, and the surface roughness can be changed to set a frictional force within a wide range.

When an input to the compression rotary member 9 abruptly changes or is too large and exceeds the output-side load, balls 8 frictionally slide along a ball lace portion 6-2-1 to cause a relative revolution in place of rolling contact, and the balls 8 and the ball lace portion 6-2-1 may be frictionally damaged.

However, in this embodiment, if the frictional sliding force of the balls 8 is represented by $T_1$, the slip force between the second friction washer 13 and the ball lace portion 91 of the compression rotary member 9 is represented by $T_2$, and the slip force between the first friction washer 12 and the rotary portion 90 of the compression rotary member 9 is represented by $T_3$, the frictional force is set to satisfy $T_1 > T_2 > T_3$, thus preventing the above-mentioned damage.

In the mechanical design, it is preferable in terms of durability and reliability of the motor to set an input $T_i$ to the compression rotary member 9 to be always used within a range of $T_2 > T_i > T_3$. In this embodiment, an engaging projection 12-1 and an engaging longitudinal groove 1-5 are formed on the inner diameter side to fix the sliding surface of the friction washer 12 to the compression-rotary member 9 side like in the second friction washer 13. In this case, when the frictional forces of the first and second washers with sides where the compression rotary member is not arranged are respectively set to fall within ranges between $T_1$ and $T_2$, and between $T_2$ and $T_3$, a structure for non-rotation processing by engagement can be omitted. However, it is relatively difficult to obtain a stable frictional force, and the balance relationship is complicated, resulting in a disadvantage in mass-production.

As described above, according to this embodiment, the following effects can be obtained.

(1) The differential mechanism can be assembled in a pencil shaped vibration driven motor without increasing the nun%her of parts, and can be integrated in a compact structure while maintaining the pencil shape.

(2) Therefore, this motor can be used in various applications since it has the pencil shape, and is suitable for rendering equipment compact, resulting in high versatility.

(3) Since it is easy in terms of the structure to commonly use the parts of a simple pencil shaped vibration driven motor, both the motor alone and the differential mechanism built-in motor can be developed and manufactured with low cost.

(4) Since the motor can be assembled from one direction, assembling cost is low, and the manufacture using an automatic assembling machine can be facilitated.

Figure 3:
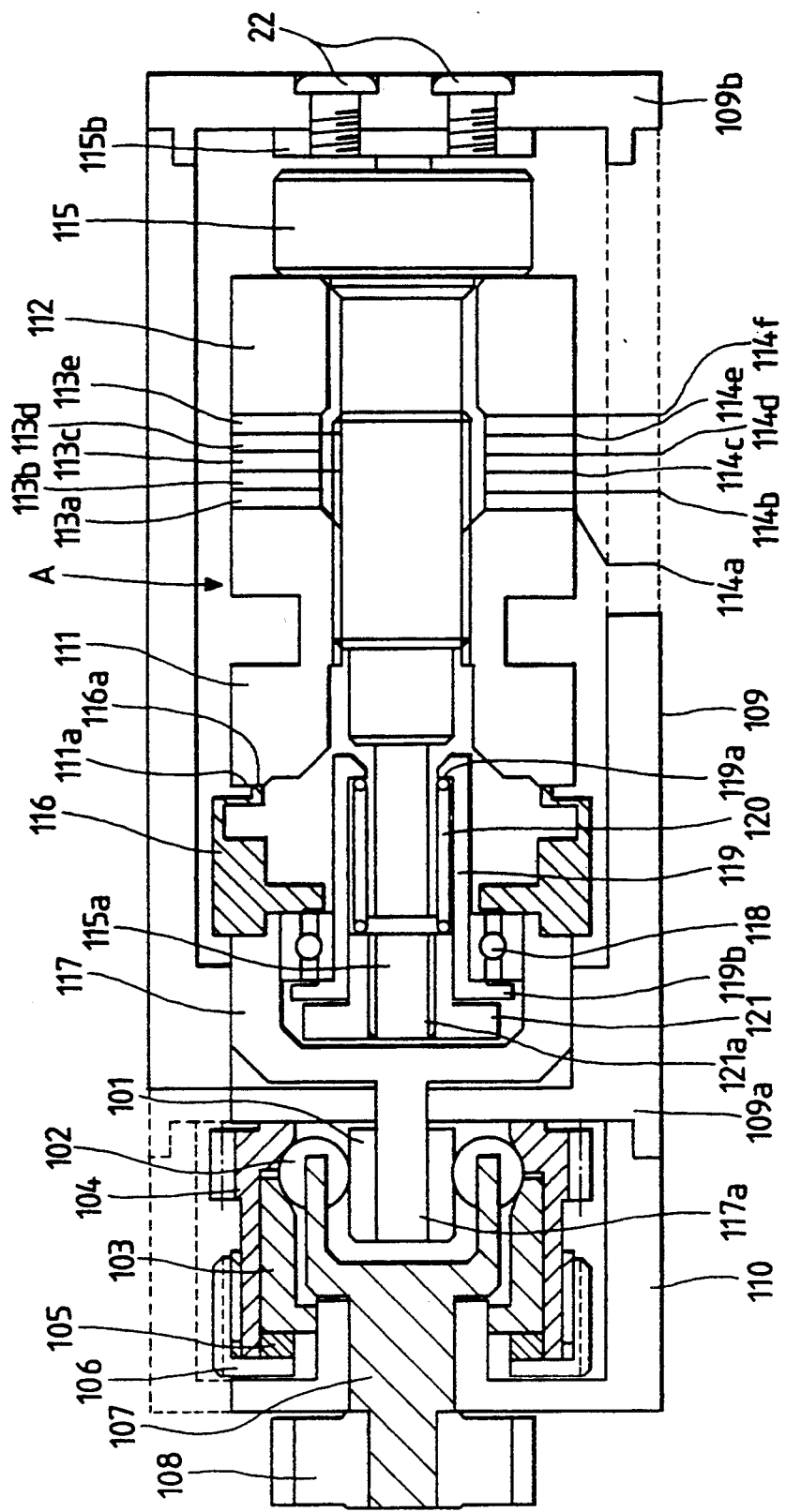
FIG. 3 is a sectional view of a motor driving apparatus according to a third embodiment of a present invention.

An apparatus shown in FIG. 3 comprises a shaft output member 101 coupled to the output shaft of a motor to be rotated together, ball members 102, radially compressed and clamped between the shaft output member 101, an outer member 103, and a gear 104, for causing a retainer member 107 and a gear 108 to rotate upon frictional rotation about the shaft output member 101, the outer member 103 for radially compressing and clamping the ball members 102 between itself together with the gear 104 and the shaft output member 101, the gear 104 which is rotated upon reception of the rotational force from a manual operation member (not shown), compresses and clamps the ball members 102 between itself together with the outer member 103 and the shaft output member 101, and frictionally transmits the rotational force to the ball members 102, and a compression member 105 for generating frictional forces between the outer member 103 and the gear 104, and the ball members 102, and between the shaft output men, bet 101 and the ball members 102. The compression member 105 also axially compresses, so that the outer member 103 and the gear 104 can be integrally rotated. A cap 106 is a member for integrally forming the outer member 103, the gear 104, and the compression member 105. The apparatus comprises the retainer member 107 for holding the ball members 102 so as to transmit only a rotational force about the shaft output member 101 to the ball members 102, and the gear 108 rotated together with the retainer member 107. The retainer member 107 and the gear 108 are caused to rotate by rotation of the ball members 102 about the shaft output member 101. The apparatus also comprises housings 109 and 110 constituting the above-mentioned members 101 to 108 as units.

The apparatus shown in FIG. 3 also comprises a metal columnar vibration elastic member 111, a metal pressing member 112 having the same outer diameter as that of the vibration elastic member 111, ring-shaped piezo-electric element plates 113a to 113e having the same outer diameter as that of the vibration elastic member 111, and electrode plates 114a to 114f for the piezo-electric element plates 113a to 113e. The piezo-electric element plates 113a to 113e and electrode plates 114a to 114f are arranged between the vibration elastic member 111 and the pressing member 112, and a bolt 115 is threadably engaged with the vibration elastic member 111 through the pressing member 112, thus integrally fixing these members to constitute a stator (vibrator) of a vibration driven motor A.

In the vibration driven motor A, when AC voltages having different phases are applied from a known power supply circuit (not shown) to the electrode plates 114a to 114f of the stator, the piezo-electric element plates 113a to 113e generate mechanical vibrations in the stator, and these vibrations are synthesized to excite a rope jumping like motion in the stator, thereby frictionally driving a rotor 116 (to be described below) frictionally contacting the front end portion of the stator. The rotor 116 has a rear end portion (frictional contact portion) 116a contacting a driving surface 111a of the vibration elastic member 111, and obtains a proper frictional force by compression of a compression spring 120 (to be described later).

The motor A also comprises a rotary output member 117 having an output shaft 117a, and is coupled to the rotor 116 to be rotated together. The output shaft 117a is coupled to the above-mentioned shaft output member 101 to be rotated together so as to externally transmit rotation of the rotor 116.

A bearing 118 is arranged on the inner-diameter portion of the rotary output member 117, and a hollow shaft 119 is fitted in the inner-diameter portion of the bearing 118, thus making the rotor 116 and the rotary output member 117 rotatable.

The shaft 119 is fitted in a holding member 121 (to be described later) to coincide with the central axis of the stator. The compression spring 120 presses a stepped portion 119a of the shaft 119 to press the bearing 118, and this pressing force generates a frictional force between the vibration elastic member 111 and the rotor 116.

The compression force of the compression spring 120 is generated by, e.g., inserting a pin portion 115a formed on the distal end portion of the bolt 115 into a hole portion 121a of the flat-plate like holding member 121, and fixing them using an adhesive. The arrangement of the vibration driven motor A has been described.

The vibration driven motor A is fixed by fixing a motor holding portion 115b integrally formed on the bolt 115 to a housing 109b as a fixing men%her using screws 22. Note that the stator of the vibration driven motor must be supported so as not to influence vibrations excited in the stator. Since the end of the stator corresponds to the loop position of a vibration, and only a small radial displacement occurs at this position in practice, the stator is fixed at the pin portion 115a as one end of the stator, thereby preventing any influence on the vibrations in the stator.

The housing 109b is coupled to the housing 110 together with the housing 109a, and the output shaft 117a and the shaft output member 101 are coupled to each other, thus constituting a motor driving apparatus which can output, from the gear 108, both the output from the vibration driven motor A and the input from the manual operation member.

In FIG. 4, a rotary cylinder 123 has a gear portion 123b formed for output driving, and the gear portion 123b is meshed with the gear 108 to be rotated at a constant position. The rotational angle of the rotary cylinder 123 is regulated by a stopper key 128. A helicoid screw 123a formed on the rotary cylinder 123 is helicoid-coupled to a helicoid screw portion 124a of a straight moving cylinder 124, having a lens L, for performing a focusing operation. A straight moving key 129 for inhibiting rotation is fitted in the straight moving cylinder 124. A manual operation member 125 for a manual focusing operation has a gear portion 125a, and the gear portion 125a is meshed with the gear 104. Stationary cylinders 126 and 127 are fixed to the housing 109, the stopper key 128, and the straight moving key 129 by screws.

Movements of the motor driving apparatus and the lens barrel will be described in detail below with reference to FIGS. 3 and 4.

In an auto-focusing operation, upon reception of a lens driving signal from a known driver (not shown) provided to a camera (not shown), AC voltages are applied to the electrode plates 114a to 114f of the motor A, and the rotor 116 is rotated in the predetermined direction, as described above (generally, the rotational direction is determined by reversing the advancing directions of two different phases of the AC voltages to be applied). Upon rotation of the rotor 116, the rotary output member 117 coupled to the rotor 116 to be rotated together is rotated, and the shaft output portion 101 is rotated together with the member 117. In this case, a frictional force is applied by the compression force generated by the compression member 105 between the shaft output member 101 and the ball members 102. The manual operation member 125 interlocked with the gear 104 has a larger holding force than the frictional force between the outer member 103 and the gear 104, and the ball members 102, and is not rotated in the auto-focusing operation. Therefore, since the gear 104 and the outer member 103 are not rotated, and the ball members 102 are rotated while rolling about the shaft output member, the retainer member 107 is caused to rotate by the rotation of the ball members, and the gear 108 is rotated together with the retainer member 107, thus outputting rotation. The rotary cylinder 123 interlocked with the gear 108 is rotated at a constant position by the rotation output from the gear 108, and the straight moving cylinder 124 helicoid-coupled to this rotary cylinder 123 moves straight while being guided by the straight moving key 129, thus performing the auto-focusing operation.

In a manual focusing operation, when a rotational force is externally applied to the manual operation member 125, the gear 104 meshed with the gear portion 125a of the manual operation member 125 is rotated, and the outer member 103 formed integrally with the gear 104 is also rotated. In this case, a frictional force generated by compression of the compression member 105 acts between the outer member 103 and the gear 104, and the ball members 102. In contrast to the auto-focusing operation, since the frictional force between the rotor 116 and the stator of the vibration driven motor A is larger than the frictional force between the shaft output member 101 and the ball members 102, the shaft output member 101 is not rotated. Therefore, upon rotation of the outer member 103 and the gear 104, the ball members 102 are rotated while rolling about the shaft output member 101, and the retainer member 107 is caused to rotate by the rotation of the ball members. Then, the gear 108→the rotary cylinder 123→the straight moving cylinder 124 are operated like in the auto-focusing operation, thus performing the manual focusing operation.

As described above, according to the present invention, an input from the motor and an external input from, e.g., a manual operation can be switched without requiring a special switching operation, and the selected input can be transmitted to the rotary output member. In addition, the motor as a whole can be constituted in a pencil shape, thus attaining a compact structure.

Since direct friction drive is performed using the first stage of the output from the motor as a shaft output, the amount of backlash can be decreased unlike in a conventional motor gear train.

When the motor is arranged in the lens barrel and is used as a driving source for a focusing mechanism, the auto-focusing operation can be switched to the manual focusing operation by simply pivoting the manual operation member immediately after the auto-focusing operation and without requiring any other operations (without operating an auto/manual switching operation member like in a conventional camera). For this reason, a photographer can take a photograph as he or she intends without losing a shutter opportunity.

What is claimed is:

1. A vibration driven actuator comprising:
   a supporting member;
   a vibration member arranged to generate a vibration therein in response to an applied electrical signal, and rigidly fitted on said supporting member;
   a first rotary member arranged to be rotated by said vibration, and rotatably fitted on said supporting member;
   a second rotary member which can be rotated by an external force, and is rotatably fitted on said supporting member;
   a rolling member arranged in contact with said first and second rotary members; and
   a third rotary member arranged to be rotated by rotation of said rolling, wherein said third rotary member has a gear portion for transmitting a rotational force of said first or second rotary member to an external device.

2. A vibration driven actuator comprising:
   a supporting member:

a vibration member arranged to generate a vibration therein in response to an applied electrical signal, and rigidly fitted on said supporting member;

a first rotary member arranged to be rotated by said vibration, and rotatably fitted on said supporting member;

a second rotary member which can be rotated by an external force, and is rotatably fitted on said supporting member;

a rolling member arranged in contact with said first and second rotary members; and a third rotary member arranged to be rotated by rotation of said rolling member, wherein said rolling member has a ball.

3. A vibration driven actuator according to claim 2, wherein said first rotary member has a contact portion arranged to be in contact with said vibration member, and a ball lace portion coupled to the contact portion, and urged against said rolling member.

4. A vibration driven actuator according to claim 3, wherein the contact portion of said first rotary member includes a flange shaped portion which is in contact with said vibration member.

5. A vibration driven actuator comprising:

a supporting member;

a vibration member arranged to generate a vibration therein in response to an applied electrical signal, and rigidly fitted on said supporting member;

a first rotary member arranged to be rotated by said vibration, and rotatably fitted on said supporting member;

a second rotary member which can be rotated by an external force, and is rotatably fitted on said supporting member;

a rolling member arranged in contact with said first and second rotary members; and a third rotary member arranged to be rotated by rotation of said rolling, wherein said vibration member, said first rotary member, said second rotary member, and said rolling member have substantially the same outer diameters 6. A vibration driven actuator according to claim 5, wherein said supporting member has a threaded portion as a linear bolt to be engaged with a threaded portion of said vibration member.

7. A vibration driven actuator comprising:

a supporting member;

a vibration member arranged to generate a vibration therein in response to an applied electrical signal, and rigidly fitted on said supporting member;

a first rotary member arranged to be rotated by said vibration, and rotatably fitted on said supporting member;

a second rotary member which can be rotated by an external force, and is rotatably fitted on said supporting member;

a rolling member arranged in contact with said first and second rotary members;

a third rotary member arranged to be rotated by rotation of said rolling; and a first electro-mechanical energy conversion element for generating a vibration for bending said vibration member in a first direction, and a second electro-mechanical energy conversion element for generating a vibration for bending said vibration member in a second direction different from the first direction by 90°.

8. A vibration driven actuator, having a common axis, the actuator comprising:

a vibration member arranged for generating a vibration therein in response to an electrical signal applied thereto;

a first rotary member rotatable about said common axis by said vibration;

a second rotary member rotatable about said common axis by an external force;

a roller member arranged in contact with said first and second rotary members;

a third rotary member having an output portion for transmitting a rotational force of said first or second rotary member to an external device and rotatable about said common axis by rotation of said roller member.

9. A vibration driven camera having a common axis, said camera comprising:

a vibration member arranged for generating a vibration therein in response to an electrical signal applied thereto;

a first rotary member rotatable about said common axis by said vibration;

a second rotary member rotatable about said common axis by an external force;

a roller member arranged in contact with said first and second rotary members;

a moving mechanism for moving an optical system; and a third rotary member having an output portion for transmitting a rotational force of said first or second rotary member to the moving mechanism and rotatable about said common axis by rotation of said roller member.

10. A vibration driven actuator having a common axis, said actuator comprising:

a vibration member arranged for generating a vibration therein in response to an electrical signal applied thereto;

a first rotary member rotatable about said common axis by said vibration;

a second rotary member rotatable about said common axis by an external force;

a roller member arranged for contacting said first and second rotary members;

a moving mechanism for moving a load member; and a third rotary member having an output portion for transmitting a rotational force of said first or second rotary member to the moving mechanism, and rotatable about said common axis by rotation of said roller member.

* * * * *

UNITED STATES PATENT AND TRADEMARK OFFICE
CERTIFICATE OF CORRECTION

PATENT NO. : 5,352,949

DATED : October 4, 1994

INVENTOR(S) : EGUCHI, ET AL.

It is certified that error appears in the above-indentified patent and that said Letters Patent is hereby corrected as shown below:

Column 2

Line 4, "of a" should read --of the--.
Line 9, "of a" should read --of the--.
Line 52, "foraged" should read --formed--.
Line 63, "in" should be deleted.

Column 3

Line 48, "5,124,611)." should read --5,124,611)).--

Column 5

Line 37, "nun%her" should read --number--.

Column 6

Line 1, "men," should read --member--.
Line 2, "bet" should be deleted.

Column 7

Line 5, "men%her" should read --member--.

UNITED STATES PATENT AND TRADEMARK OFFICE
CERTIFICATE OF CORRECTION

PATENT NO. : 5,352,949
DATED : October 4, 1994
INVENTOR(S) : EGUCHI, ET AL.

It is certified that error appears in the above-indentified patent and that said Letters Patent is hereby corrected as shown below:

<u>Column 8</u>

Line 63, "rolling," should read --rolling member,--.

<u>Column 9</u>

Line 40, "rolling," should read --rolling member,--.
Line 43, "diameters" should read --diameters.--

<u>Column 10</u>

Line 2, "rolling;" should read --rolling member;--.

Signed and Sealed this

Seventh Day of March, 1995

Attest:

BRUCE LEHMAN

Attesting Officer     Commissioner of Patents and Trademarks